United States Patent
Vogt et al.

(10) Patent No.: US 7,103,696 B2
(45) Date of Patent: Sep. 5, 2006

(54) CIRCUIT AND METHOD FOR HIDING PEER DEVICES IN A COMPUTER BUS

(75) Inventors: Paul Vogt, Geneva, FL (US); Thomas Trocine, Oviedo, FL (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 11/071,613

(22) Filed: Mar. 3, 2005

(65) Prior Publication Data

US 2005/0144349 A1 Jun. 30, 2005

Related U.S. Application Data

(63) Continuation of application No. 09/825,818, filed on Apr. 4, 2001, now abandoned.

(51) Int. Cl.
- G06F 13/00 (2006.01)
- G06F 3/00 (2006.01)
- H05K 7/10 (2006.01)

(52) U.S. Cl. ............................ 710/301; 710/14; 710/17; 710/107

(58) Field of Classification Search ................ 710/104, 710/107, 262, 301, 313, 8, 10, 14, 15, 17
See application file for complete search history.

(56) References Cited

U.S. PATENT DOCUMENTS

| | | | |
|---|---|---|---|
| 4,586,128 A | 4/1986 | DeWoskin | |
| 5,430,676 A | 7/1995 | Ware et al. | |
| 5,560,019 A | 9/1996 | Narad | |
| 5,640,571 A | 6/1997 | Hedges et al. | |
| 5,696,949 A | 12/1997 | Young | |
| 5,796,981 A | 8/1998 | Abudayyeh et al. | |
| 5,812,858 A | 9/1998 | Nookala et al. | |
| 5,835,733 A | 11/1998 | Walsh et al. | |
| 5,848,249 A * | 12/1998 | Garbus et al. | 710/311 |
| 5,848,253 A | 12/1998 | Walsh et al. | |
| 5,875,312 A | 2/1999 | Walsh et al. | |
| 5,943,507 A | 8/1999 | Cornish et al. | |
| 5,970,234 A | 10/1999 | Jin | |
| 6,094,690 A * | 7/2000 | Lee | 710/10 |
| 6,115,780 A | 9/2000 | Furuta | |
| 6,125,418 A * | 9/2000 | Cox et al. | 710/104 |
| 6,128,686 A | 10/2000 | Sabotta et al. | |
| 6,151,708 A * | 11/2000 | Pedrizetti et al. | 717/173 |
| 6,173,341 B1 * | 1/2001 | Emerson et al. | 710/8 |
| 6,173,374 B1 | 1/2001 | Heil et al. | |
| 6,360,291 B1 * | 3/2002 | Tavallaei | 710/306 |
| 6,433,601 B1 | 8/2002 | Ganesan | |
| 6,502,156 B1 | 12/2002 | Sacker et al. | |

OTHER PUBLICATIONS

PCI Local Bus Specification. Revision 2.2 PCI Special Interest Group. Dec. 18, 1998. Chapters 1-3. pp. ii-xx and 1-112.*

* cited by examiner

*Primary Examiner*—Mark H. Rinehart
*Assistant Examiner*—Thomas J. Cleary
(74) *Attorney, Agent, or Firm*—Enrique J. Mora; Beusse, Wolter, Sanks, Mora & Maire, P.A.

(57) ABSTRACT

Circuit and method for hiding peer devices from a computer host are provided. The devices and host share a common electrical bus, e.g., a PCI bus. The method allows to generate a signal indicative of the presence of a first peer device. The method further allows to hide a second peer device from the host so that the second device is controlled by the first peer device whenever the signal indicates the presence of the first device.

15 Claims, 3 Drawing Sheets

CIRCUIT AND METHOD FOR HIDING PEER DEVICES IN A COMPUTER BUS

This application is a continuation of U.S. patent application Ser. No. 09/825,818, filed Apr. 4, 2001, now abandoned which is incorporated herein by reference in its entirety.

BACKGROUND OF THE INVENTION

The present invention generally relates to techniques for hiding peer devices in a computer bus and, more particularly, to a circuit and method for hiding peer devices in a PCI (peripheral component interconnect) bus to avoid conflicts of such devices with a host system.

It is known that requirements of high performance and reliable networks have led to advances in disk drives and in disk subsystem architectures. Disk drive storage sizes have increased, access times have decreased, and data transfer rates have increased. Processing capabilities of personal computers and workstations have also advanced. As more clients are added to a given network and the processing capability of those clients increase, there is a continuing push to further enhance the performance of disk subsystems servicing that network.

In response to the need for reliable and inexpensive disk drive subsystems, redundant array of independent disk (RAID) architectures have been developed. RAID architectures can provide error detection and duplicate storage of information on a disk drive subsystem in the event one or more disk drives in the disk drive subsystem fail. Some of the advantages provided by RAID architectures have been higher data transfer rates, increased disk capacity, higher input/output (I/O) rates, and faster data access. Depending upon which level of RAID architecture was implemented, various features, such as disk striping, mirroring, parity checking, or combinations thereof, have been used. These RAID implementations and others are well known to those of ordinary skill in the art.

Some known RAID implementations have included in a pluggable add-in card devices such as an I/O processor loaded with suitable firmware to perform the RAID functionality, and an I/O controller coupled to a respective disk drive. In one known implementation, referred to as Zero Channel RAID (ZCR), the RAID card was simplified to include just the I/O processor and not the I/O controller. This implementation conveniently uses the I/O controller embedded on the motherboard of the host computer. Thus, this ZCR implementation reduces the cost of the RAID card since there is no need to duplicate the I/O controller circuitry provided in the motherboard of the host computer.

At least two techniques are known that have attempted to avoid conflicts that could arise when more than two control devices, such as the host system and the add-in RAID processor, try to assert control of another device, such as the embedded I/O controller. In one of such techniques, there is no attempt to hide any of the devices sharing a common bus, such as a PCI bus, from one another. Thus, whenever the host system needs to communicate with any target device, such as the embedded I/O controller, and another device, such as the add-in RAID processor, needs to communicate with that same target device, there has to be a higher level arbiter for managing communication between the RAID processor and the host system to negotiate which device is going to control the target device. The operating system supplied by the computer manufacturer somehow would have to understand how to communicate and negotiate such transaction regardless of the specific firmware and hardware of the add-in devices. It will be appreciated that this task is very complicated since such hardware and firmware may vary from vendor to vendor. Further, even if the add-in devices were supplied by a single vendor, due to the rapidly changing nature of computer technology, the hardware and firmware of such add-in devices are likely to change over time due to evolutionary changes. Thus, it is very burdensome for any supplier of operating systems, e.g., Microsoft, to support all the different mechanisms for negotiating that control.

Another technique has provided circuitry on the motherboard to intermittently hide the devices from one another. For example, when the RAID processor needs to communicate with the I/O controller, the RAID processor may send a signal to make visible or "unhide" the I/O controller. The RAID processor would run for a relatively short period of time during which communication with the I/O controller would occur. The RAID processor would then send a signal to conceal or "hide" the I/O controller. The reason for such intermittent "hiding" and "unhiding" actions is that one would want to avoid the host system to detect the presence of the I/O controller. One drawback of this technique is that prior to the time the RAID controller turns on the "unhide" signal and communicates with the I/O controller, that RAID controller has to initially request for a grant of the bus and there may be conditions where such bus grant may be denied by the host system. For example, the host system may require access to the bus at the same time. And since the host system generally has priority over control of the bus, the host may have initial access to the bus. In this scenario, once the "unhide" signal turns on, the operating system of the host would detect the presence of the I/O controller and would undesirably assume control of that controller. The fact remains that under this other technique there is a window of opportunity for conflicts between the host and the add-in RAID processor.

In view of the foregoing difficulties, it would be desirable to provide a technique that overcomes such difficulties. For example, it would be desirable that when the add-in card is plugged into an expansion slot, the I/O controller embedded in the motherboard be concealed from the operating system and such I/O controller becomes visible only to the RAID processor on the add-in card.

BRIEF SUMMARY OF THE INVENTION

Generally, the present invention fulfills the foregoing needs by providing in one aspect thereof a method for hiding peer devices from a computer host. The devices and host share a common electrical bus. The method allows for generating a signal indicative of the presence of a first peer device. The method further allows for electrically hiding a second peer device from the host so that the second device is controlled by the first peer device whenever the signal indicates the presence of the first device.

The present invention further fulfills the forgoing needs by providing in another aspect thereof, a circuit for hiding peer devices from a computer host. The devices and host share a common electrical bus generally controlled by the host. The circuit includes a generating module configured to supply a signal indicative of the presence of a first peer device. The circuit further includes a hiding module configured to hide a second peer device from the host so that the second device is controlled by the first peer device whenever the signal indicates the presence of the first peer device.

Figure 1:
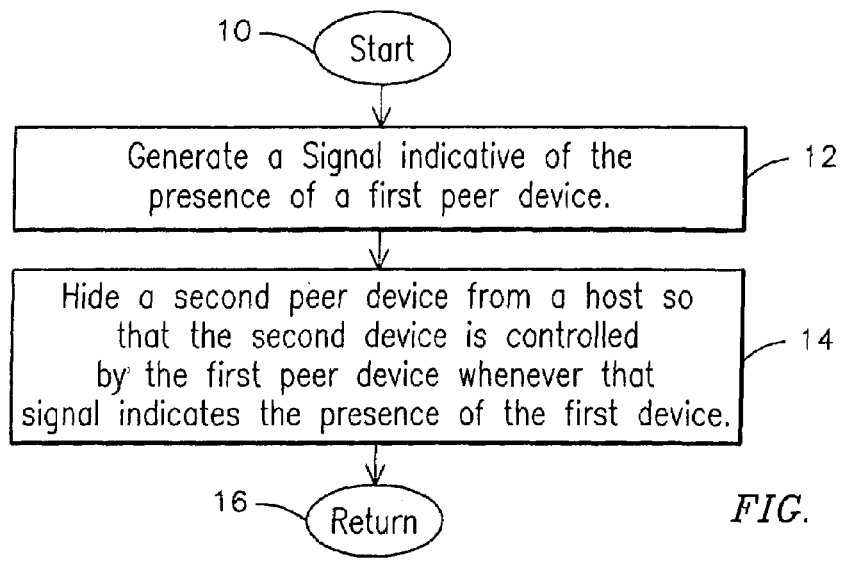
FIG. 1 illustrates a flow chart including exemplary steps of a method for hiding peer devices from a computer host.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 illustrates a flow chart including exemplary steps of a method for hiding peer devices from a computer host. As used herein, a peer device refers to a device which resides on the same bus segment as another device, e.g., the peer devices are connected to one another through the same bus segment. The devices and host generally share a common electrical bus. In one exemplary embodiment, the bus comprises a PCI bus. It will be understood, however, that the techniques of the present invention can be readily adapted to other types of peripheral buses commonly used in computers to provide a relatively high-speed data path between the central processor unit (CPU) of the host and peripheral devices, such as disks, video, scanners, network, etc. Subsequent to start step 10, step 12 generates a signal which indicates the presence of a first peer device. Prior to return step 16, step 14 hides, e.g., electrically and/or logically, a second peer device from the host so that the second device is controlled by the first peer device whenever that signal indicates the presence of the first device.

Figure 2:
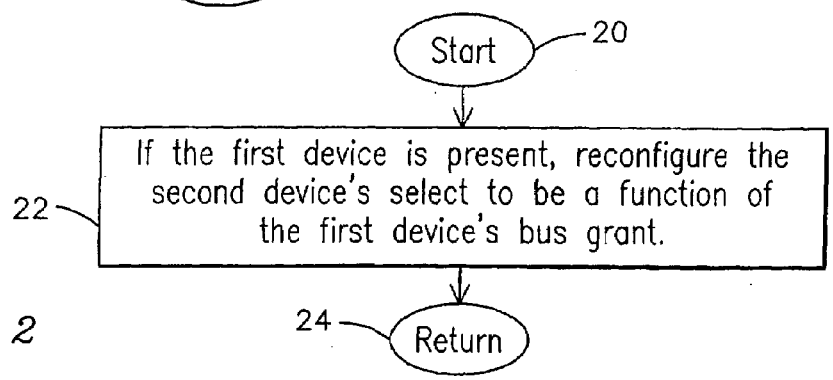
FIG. 2 illustrates a flow chart illustrating further details in connection with the hiding method of FIG. 1

FIG. 2 illustrates details that enable to hide the second peer device from the first peer device. Subsequent to start step 20 and prior to return step 24, if the first device is present, step 22 reconfigures the select signal of the second device to be a function of a bus grant signal of the first device. This reconfiguration results in the second device being exclusively controlled by the first device in lieu of the host and avoids logical conflicts between such devices and the host. In one exemplary embodiment, as further described below, the reconfiguration allows to mask a host initialization select signal in response to the signal indicative of the presence of the first device. In that exemplary embodiment, the bus grant signal is configured to grant exclusive control rights to the first peer device, in lieu of the host, over the second peer device.

Figure 3:
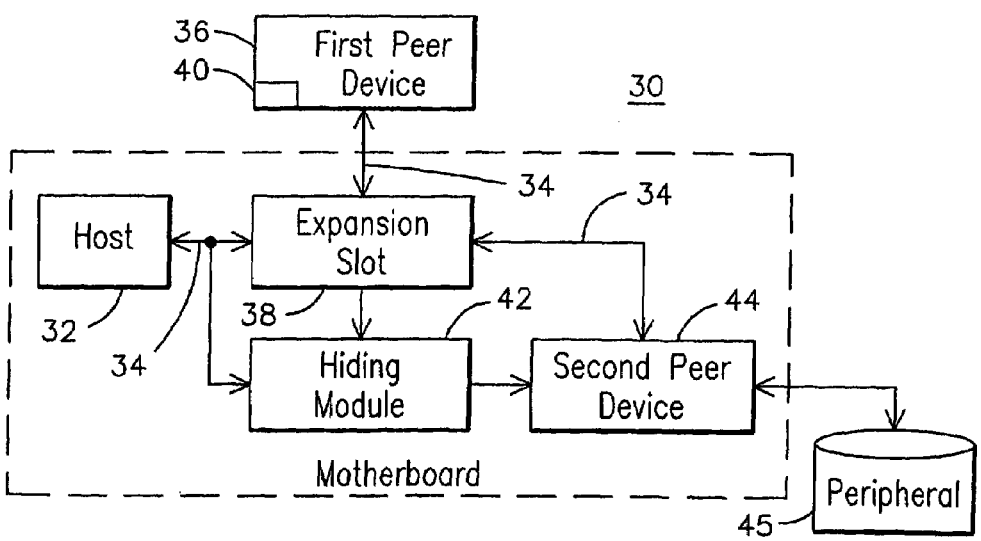
FIG. 3 illustrates a block diagram schematic of an exemplary circuit that may be used for implementing the hiding method of FIGS. 1 and 2.

FIG. 3 illustrates an exemplary circuit 30 that may be used for implementing the hiding method described above in the context of FIGS. 1 and 2. As suggested above, circuit 30 allows to hide peer devices from a computer host 32. The devices and host 32 share a common electrical bus 34 generally controlled by host 32. As shown in FIG. 3, a first peer device 36 may be pluggable to a suitable expansion slot 38. In one exemplary implementation, first peer device comprises an add-in RAID processor, such as a ZCR processor. It will be appreciated, however, that the techniques of the present invention are not limited to any specific processor device since the first peer device may comprise any type of device capable of initiating bus ownership transactions through bus 34 relative to a target peer device that shares the same bus segment. Peer device 36 includes a generating module 40 configured to supply a signal indicative of the presence of first peer device 36 in expansion slot 38. A hiding module 42 is configured to hide from host 32 a second peer device 44 embedded on the motherboard of the host so that second device 44 is exclusively controlled by first peer device 36 in lieu of host 32 whenever the signal from module 40 indicates the presence of first peer device in expansion slot 38. In one exemplary embodiment, second peer device comprises an input/output (I/O) controller coupled to a respective peripheral 45, such as a disk or any other appropriate peripheral for a given application.

Figure 4:
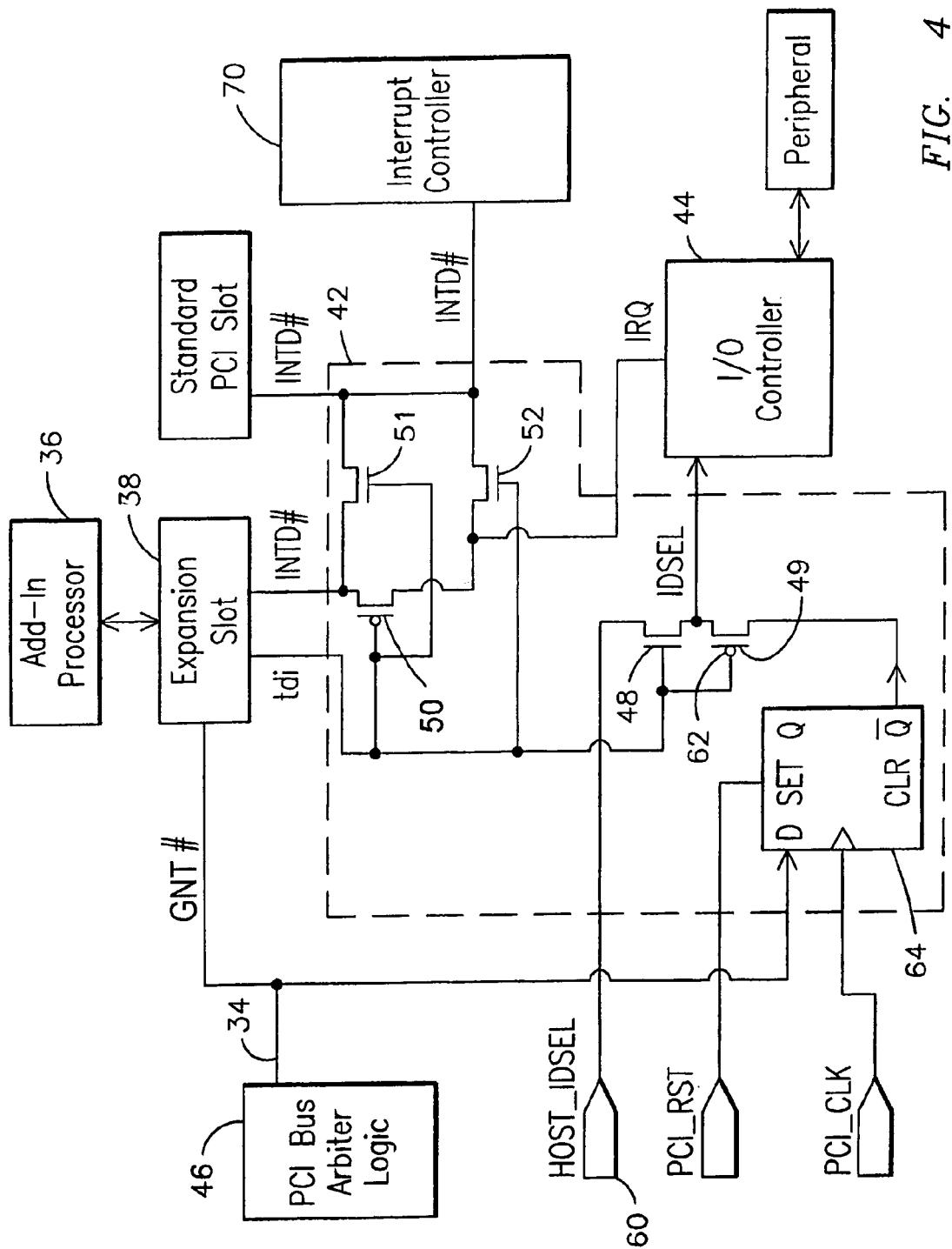
FIG. 4 illustrates a schematic illustrating further details regarding one exemplary embodiment of the circuit of FIG. 3 as used for hiding an I/O controller from an add-in processor pluggable through a respective expansion slot in a PCI bus.

FIG. 4 illustrates further details in connection with hiding module 42 in accordance with one exemplary embodiment of the present invention. As will be understood by one of ordinary skill in the art, any initiator devices on the PCI bus generally request host arbitration for ownership of the PCI bus by asserting a request (REQ#) signal to a bus arbiter 46. Arbiter 46 would grant ownership of the bus to the initiator device by asserting a grant (GNT#) signal. PCI bus arbitration is well-understood by those skilled in the art and need not be described in any greater detail for the purposes of present invention. In one exemplary embodiment, the signal indicative of the presence of add-in processor 36 in expansion slot 38 is represented in FIG. 4 by the letters TDI (Test Data Input). That is, signal TDI activates the hiding module 42 when the add-in processor is plugged in expansion slot 38. In one example, whenever add-in processor 36 is plugged in expansion slot 38, then signal TDI is driven to a logical value of zero. Conversely, when expansion slot 38 is unused then signal TDI is driven to a logical value of one.

In the exemplary embodiment shown in FIG. 4, a plurality of switches, e.g., switches 48–52 is used to implement the hiding action described in the context of FIGS. 1–3 above. As shown in FIG. 4, a host initialization device select (HOST_IDSEL) signal 60 is normally used as a device select during standard PCI configuration transactions, such as read, write, etc. As suggested above, when add-in processor 36 is plugged into expansion slot 38, then the TDI signal takes a logical value of zero. Thus, switch 48 is actuated in a nonconductive state, and consequently, the HOST_IDSEL signal is masked or blocked from passing through switch 48 into the IDSEL pin of I/O controller 44. Conversely, switch 49 is actuated into a conductive state through a suitable inverter 62 when the value of the TDI signal is logic zero. As illustrated in FIGS. 3 and 4, each small circle symbol shown at the gating terminal of any corresponding switch represents a logic inverter. That is, a device that outputs a logic zero signal when the input is a logic one signal and outputs a logic one signal when the input is a logic zero signal. As suggested above, the request (REQ#) signal is used by a PCI initiator device to request ownership of the bus, and the bus grant (GNTx#) signal would indicate that the request of such initiator device has been granted. As shown in FIG. 4, the grant signal is propagated through a flip-flop 64 so that the select signal to device 44 is active during the address phase of the configuration cycle, per the PCI protocol specification. Thus, it will be appreciated that whenever add-in processor 36 is plugged in expansion slot 38, hiding module 42 hides I/O controller 44 from the host. The HOST_IDSEL signal from the host is masked by switch 48 while the grant signal associated with add-in processor 36 is propagated by flip-flop 64 to the initialization device select (IDSEL) pin of I/O controller 44. As further shown in FIG. 4, an interrupt (INTD#) signal is passed through switch 50 to the interrupt request (IRQ) pin of I/O controller 44. In case that add-in processor 36 is not plugged into expansion slot 38, then the interrupt signal would be supplied by a standard interrupt controller 70 on the motherboard of the host to the IRQ pin of I/O controller 44 through switch 52.

Figure 5:
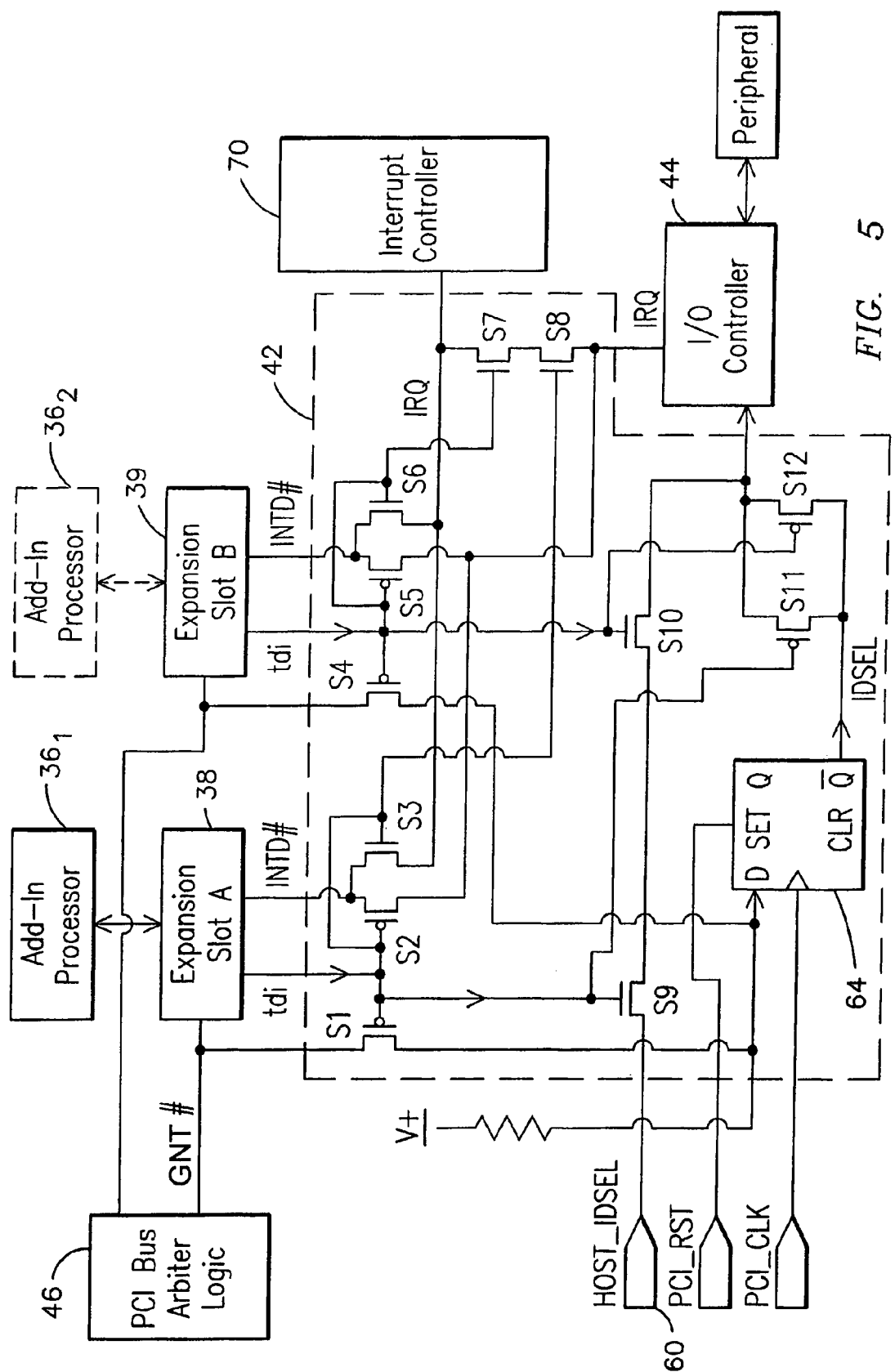
FIG. 5 illustrates a schematic of another exemplary embodiment of the circuit of FIG. 3 configured to receive an add-in processor in one of multiple expansion slots.

FIG. 5 illustrates another exemplary embodiment of a circuit for hiding peer devices on a peripheral bus, such as a PCI bus. In this embodiment, multiple expansion slots, such as slots 38 and 39, are respectively configured to support the device hiding function. This embodiment provides additional flexibility to the end user since in this embodiment the add-in processor could be installed in any respective one of such multiple slots, e.g., expansion slots 38 and 39. In this exemplary embodiment, assuming that add-in processor is actually installed into slot 36, this would set the respective TDI signal for that expansion slot to a logic level of zero. Conversely, the unoccupied slot would set the TDI signal for that expansion slot, e.g., expansion slot 39, to a logic level of one. As suggested above, the respective TDI signals would be received by a plurality of switches, such as switches S1 to S12, appropriately configured to implement the logical interrelationships required to implement the hiding function. That is, the appropriate logic needed to propagate the respective grant signal corresponding to the add-in processor 36 in expansion slot 38 to the initialization device select pin of the I/O controller 44 so that add-in processor 36 exclusively accesses the I/O controller 44 during a configuration cycle. Once again assuming that add-in processor 36 is plugged in expansion slot 38, then the TDI signal corresponding to expansion slot 38 would be driven to a logical state of zero and this would turn on switches S1, S2, S11 and would turn off switches S3, S9, and S8. Conversely, the TDI signal correspondent to expansion slot 39 would be driven to a logical state of one which would turn-on switches S6, S7, and S10. And each of switches S4, S5, and S12 would be in a respective turn off state for the above example. Thus, it will be appreciated that since switch S9 is in a nonconductive estate, this would allow for masking the HOST_IDSEL signal normally supplied by the host to I/O controller 44. In this example, switch S11 would allow for coupling the output signal from flip-flop 64 to the IDSEL pin of I/O controller 44. The output signal from flip-flop 64, in this example represents the grant signal corresponding to the add-in processor in expansion slot 38. It will be appreciated that the use of switches, as illustrated in the embodiments of FIGS. 4 and 5, for implementing the hiding logic merely represents an exemplary implementation of such logic. It will be appreciated, however, that such logic could have been implemented using logical gates instead of switching devices. Further, it is contemplated that instead of using hardware devices, such logic could be implemented using a suitable software module.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A method for hiding devices from a computer host, said devices and host sharing a common electrical bus, said method comprising:
   providing one or more expansion slots configured to receive a respective add-in card including a processor therein;
   generating a signal indicative of the presence of said add-in card in one of the expansion slots;
   in response to said signal indicative of the presence of said add-in card, masking a host device select signal provided to a select signal input of a device on said host and generally used by said host to recognize said device;
   imparting a predefined time delay to a bus grant signal configured to grant to said processor on said add-in card an exclusive access to said common electrical bus so that said host is prevented from communicating with said device, wherein said time delay corresponds to a clocking cycle of a clocking signal for said electrical bus; and
   propagating said bus grant signal to said select signal input of said device upon completion of said clocking cycle and the signal indicative of the presence of said add-in card actually indicating the presence of said add-in card in one of the expansion slots, thereby propagating said bus grant signal synchronously with the clocking signal for said electrical bus for effecting the exclusive access of said processor over said common electrical bus for communicating with said device.

2. The method for hiding devices of claim 1 wherein said electrical bus comprises a peripheral connect interface bus.

3. The method for hiding devices of claim 1 wherein said processor on said add-in card comprises a RAID processor.

4. The method for hiding devices of claim 1 wherein said device comprises an I/O controller.

5. The method for hiding devices of claim 1 further comprising passing the host device select signal from the host to the device in the absence of said add-in card.

6. A circuit for hiding peer devices from a computer host, said devices and host sharing a common electrical bus generally controlled by said host, said circuit comprising:
   a generating module configured to supply a signal indicative of the presence of a first peer device;
   a hiding module configured to non-intermittently hide a second peer device from said host so that said second device is controlled by said first peer device whenever said signal indicates the presence of said first peer device, wherein said hiding module comprises a masking module coupled to receive said signal indicative of the presence of said first device to mask a host device select signal generally supplied by the host to a select signal input of said second peer device; and
   a delay device for imparting a predefined time delay to a bus grant signal configured to grant exclusive bus access rights to the first peer device, in lieu of said host, for communication with said second peer device, wherein said time delay corresponds to a clocking cycle of a clocking signal for said electrical bus, said delay device electrically coupled to propagate said bus grant signal to said select signal input of said second peer device upon completion of said clocking cycle and the signal indicative of the presence of the first peer device actually indicating the presence of said first device, thereby propagating said bus grant signal synchronously with the clocking signal for said electrical bus for effecting the exclusive access rights of said first peer device over said common electrical bus for communicating with said second peer device.

7. The circuit for hiding peer devices of claim 6 wherein said electrical bus comprises a peripheral connect interface bus.

8. The circuit for hiding peer devices of claim 6 wherein said first peer device comprises a RAID processor.

9. The circuit for hiding peer devices of claim 8 wherein said second peer device comprises an I/O controller.

10. The circuit for hiding peer devices of claim 9 wherein said I/O controller is embedded in a motherboard of the host.

11. The circuit for hiding peer devices of claim 8 wherein said RAID processor is disposed on an add-in card.

12. The circuit for hiding peer devices of claim 6 wherein said masking module is further configured to pass the host select signal from the host to the second peer device in the absence of said first peer device.

13. The circuit of claim 6 wherein said delay device comprises a flip-flop.

14. The circuit of claim 6 wherein said masking module comprises a plurality of switches.

15. The circuit of claim 6 wherein said masking module comprises a plurality of logical gates.

* * * * *